(12) United States Patent
Chang

(10) Patent No.: US 10,223,285 B2
(45) Date of Patent: Mar. 5, 2019

(54) DATA STORAGE DEVICE AND DATA STORAGE METHOD

(71) Applicant: Silicon Motion, Inc., Jhubei (TW)

(72) Inventor: Ya-Sung Chang, Hsinchu (TW)

(73) Assignee: Silicon Motion, Inc., Jhubei (TW)

( * ) Notice: Subject to any disclaimer, the term of this patent is extended or adjusted under 35 U.S.C. 154(b) by 121 days.

(21) Appl. No.: 15/264,196

(22) Filed: Sep. 13, 2016

(65) Prior Publication Data

US 2017/0147504 A1 May 25, 2017

(30) Foreign Application Priority Data

Nov. 19, 2015 (TW) .............................. 104138203 A

(51) Int. Cl.
*G06F 12/10* (2016.01)
*G06F 12/109* (2016.01)
*G06F 12/1009* (2016.01)
*G06F 12/02* (2006.01)

(52) U.S. Cl.
CPC ........ *G06F 12/109* (2013.01); *G06F 12/0246* (2013.01); *G06F 12/1009* (2013.01); *G06F 2212/657* (2013.01); *G06F 2212/7201* (2013.01)

(58) Field of Classification Search
CPC . G06F 12/109; G06F 12/0246; G06F 12/1009
See application file for complete search history.

(56) References Cited

U.S. PATENT DOCUMENTS

| 7,818,525 | B1 * | 10/2010 | Frost | G06F 12/0246 |
| | | | | 365/185.25 |
| 8,291,185 | B2 * | 10/2012 | Na | G06F 3/0613 |
| | | | | 711/156 |
| 2005/0108491 | A1 * | 5/2005 | Wong | G11C 29/50 |
| | | | | 711/167 |
| 2006/0227378 | A1 | 10/2006 | Mihira | |
| 2008/0201661 | A1 * | 8/2008 | Haynes | G06F 3/0607 |
| | | | | 715/810 |
| 2009/0193174 | A1 * | 7/2009 | Reid | G06F 12/0246 |
| | | | | 711/100 |
| 2010/0162370 | A1 * | 6/2010 | Altay | G06F 21/335 |
| | | | | 726/5 |
| 2010/0217918 | A1 | 8/2010 | Chen | |
| 2012/0239990 | A1 * | 9/2012 | Mataya | G06F 12/0866 |
| | | | | 714/704 |
| 2013/0138871 | A1 * | 5/2013 | Chiu | G06F 12/0246 |
| | | | | 711/103 |
| 2013/0290609 | A1 * | 10/2013 | Lee | G06F 12/0246 |
| | | | | 711/103 |

(Continued)

OTHER PUBLICATIONS

Office Action of corresponding TW application, published on Apr. 28, 2017.

*Primary Examiner* — Ryan Bertram
(74) *Attorney, Agent, or Firm* — Wang Law Firm, Inc.

(57) ABSTRACT

A data storage device utilized for storing at least one data includes a memory and a controller. The memory includes a plurality of blocks, and each of the blocks has a different respective physical address. The controller is coupled to the memory for mapping the physical addresses to a plurality of logical addresses. After the controller receives a conversion-requesting instruction, it converts a specific logical address from being mapped to a first physical address to being mapped to a second physical address.

15 Claims, 3 Drawing Sheets

(56) References Cited

U.S. PATENT DOCUMENTS

| | | | |
|---|---|---|---|
| 2014/0189211 A1* | 7/2014 | George | G06F 3/0613 711/103 |
| 2015/0046670 A1* | 2/2015 | Kim | G06F 12/0246 711/207 |
| 2016/0062885 A1* | 3/2016 | Ryu | G06F 12/0246 711/103 |
| 2016/0118132 A1* | 4/2016 | Prins | G11C 16/26 714/704 |
| 2017/0003967 A1* | 1/2017 | Lin | G06F 9/3017 |
| 2017/0097781 A1* | 4/2017 | Reimers | G06F 3/0616 |

* cited by examiner

DATA STORAGE DEVICE AND DATA STORAGE METHOD

CROSS REFERENCE TO RELATED APPLICATIONS

This Application claims priority of Taiwan Patent Application No. 104138203 filed on Nov. 19, 2015, the entirety of which is incorporated by reference herein.

BACKGROUND OF THE INVENTION

Field of the Invention

The disclosure generally relates to a data storage device and a data storage method, and more particularly, to a data storage device and a data storage method which convert mapping relationships between the logical address and the physical address.

Description of the Related Art

The technology of data storage devices has been rapidly improving in recent years. Many portable data storage devices, such as memory cards of the SD/MMC standard, CF standard, MS standard and XD standard, solid-state disks and embedded multi-media cards (eMMC) have been widely utilized in many ways. Therefore, effective access control becomes important for these data storage devices.

However, regarding non-volatile data storage devices, users might read data in a specific physical address frequently. As such, the non-volatile data storage device could be damaged, and the data in the specific physical address cannot be read correctly. Therefore, an effective data storage device and data storage method are needed in order to prevent the data in the specific physical address from becoming damaged due to frequent reading, to increase the usage period of the data storage device, and to confirm the accuracy of accessing data.

BRIEF SUMMARY OF THE INVENTION

In order to solve the aforementioned problem, the invention proposes a data storage device and a data storage method to record, calculate and analyze the access number of data accessed by the host. The specific logical address which is frequently read is discovered by comparing whether the access number is greater than a threshold value or not. Accordingly, the logical address is made to correspond to another different physical address. Therefore, the present invention could prevent the memory from being damaged by over-accessing the same data to maintain the accuracy of accessing data.

In one aspect of the invention, the present invention provides a data storage device utilized for storing at least one data, wherein the data storage device includes a memory and a controller. The memory includes a plurality of blocks, and each of the blocks has a different physical address. The controller is coupled to the memory for mapping the physical addresses to a plurality of logical addresses. After the controller receives a conversion-requesting instruction, it converts a specific logical address from being mapped to a first physical address to being mapped to a second physical address.

In one embodiment, the conversion-requesting instruction is generated by the host. The host analyzes the access number of the data to determine the specific logical address which needs conversion. The host records the data with unit of file, data size and/or cluster, and it calculates the access number of the file, the data size and/or the cluster. When an access number of at least one data of the plurality of data is greater than a threshold value, the host determines that the logical address corresponding to the data is the specific logical address. The threshold value is determined by the type of memory and/or usage environment of the data storage device. After the specific logical address is converted for mapping to the second physical address, the controller transmits a conversion-finish instruction to a host which couples to the controller.

In another aspect of the invention, the present invention provides a data storage method utilized for a host and a data storage device for storing at least one data. The data storage method includes mapping a plurality of physical addresses to a respective plurality of logical addresses; after receiving a conversion-requesting instruction, converting a specific logical address from mapping to a first physical address to mapping to a second physical address based on the conversion-requesting instruction; and after the specific logical address is converted for mapping to the second physical address, transmitting a conversion-finish instruction to a host which couples to the controller.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
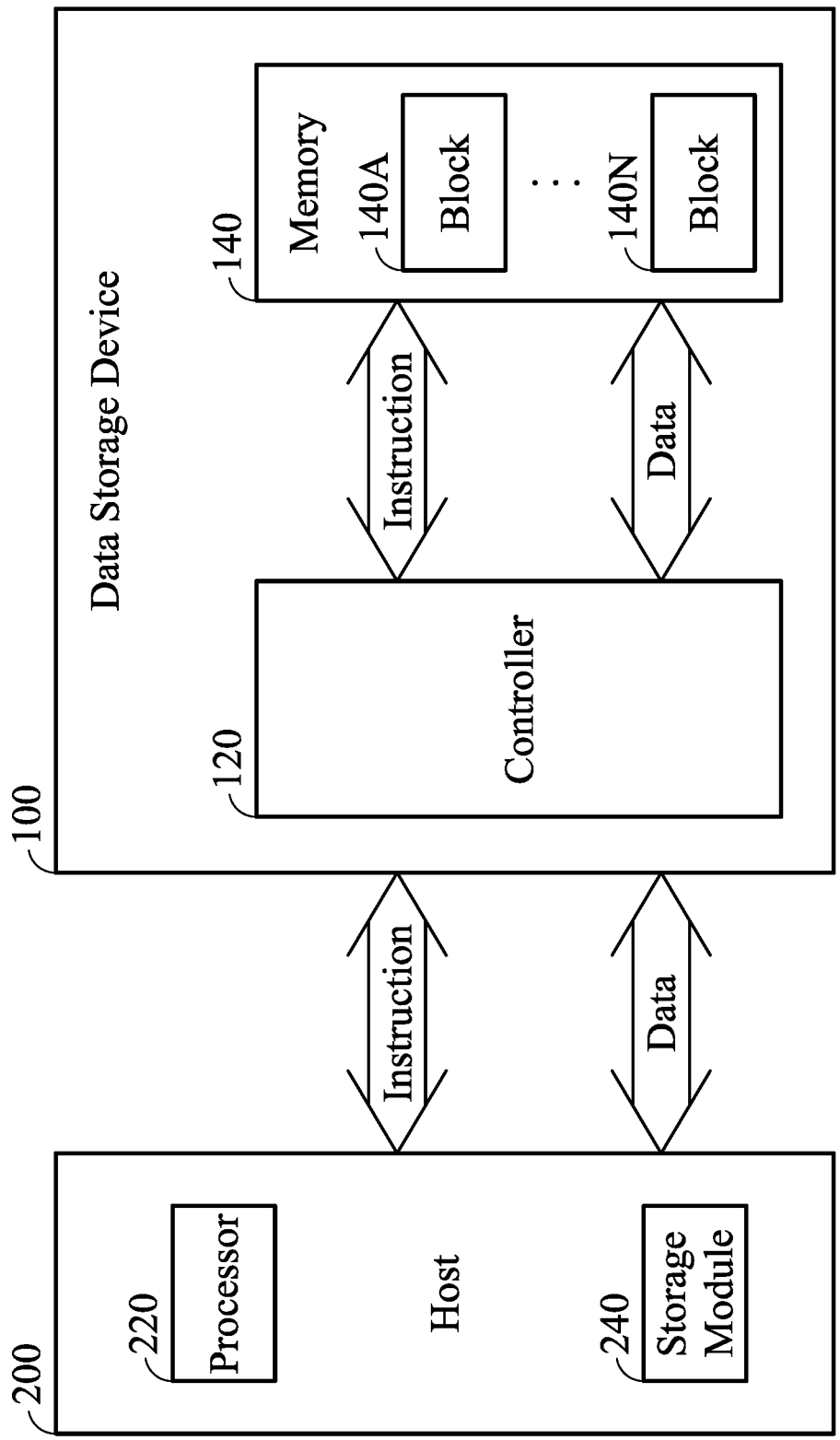
FIG. 1 is a schematic diagram of a data storage device and a host according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of a data storage device 100 and a host 200 according to an embodiment of the invention. In one embodiment, the data storage device 100 includes a controller 120 and a memory 140. The data storage device 100 couples the host 200 to transmit data and instructions or receive data and instructions. The memory 140 could be non-volatile memory such as NAND flash. The host 200 could be a mobile phone, a tablet computer, a laptop computer, a navigation device or in-vehicle system. As shown in FIG. 1, the host 200 includes a processor 220 and a storage module 240. For example, the storage module 240 is utilized to record data which is accessed (being written and read) by the host 200. The processor 220 analyzes the access number of the host 200 according to the data stored by the storage module 240.

As shown in FIG. 1, the memory 140 includes a plurality of blocks 140A-140N. Specifically, each of the blocks 140A-140N further includes a plurality of pages. When the controller 120 performs a reading operation or a storing operation on the memory 140, it controls the memory 140 to perform the reading or programming operation with the unit of memory page. The controller 120 performs reading operation to the memory 140 by controlling the memory 140 with the unit of cluster. In addition, the controller 120 couples to the memory 140 to transmit data and instructions or receive data and instructions mutually. Furthermore, the controller 120 could be a read-only-memory (ROM) and a micro-controller with firmware code, and the micro-controller executes the firmware code to operate or access the memory 140.

Regarding the memory 140, each of the blocks 140A-140N has different physical addresses. In other words, each of the blocks 140A-140N has a physical address, and each physical address of the blocks 140A-140N is different. When a writing operation is executed by a data storage device 100, the controller 120 determines a physical address of the memory 140 for writing or storing data. In addition, the physical addresses are mapped to a plurality of respective logical addresses by the controller 120. Therefore, for the host 200, the host 200 reads or writes data which is stored in a logical address by the data storage device 100 through the logical address, i.e., the logical block address (LBA).

For example, the data storage device 100 is utilized for a navigation system or an in-vehicle system in a car. When users use the navigation system or the in-vehicle system, some specific data stored in the data storage device 100, such as a map of the user's city, may be read or accessed frequently. Accordingly, the host 200 will need to read a specific file in the specific logical address. Afterwards, the specific file of the physical address (such as the first physical address) corresponding to the specific logical address will be read by the controller 120 based on the mapping relationship of the logical addresses and the physical addresses. In other words, the first physical address of the memory 140 will be read frequently.

In one embodiment, after the controller 120 receives a conversion-requesting instruction, it converts a specific logical address from mapping to the first physical address to mapping to the second physical address which is different from the first physical address according to the conversion-requesting instruction. Specifically, the conversion-requesting instruction relates to an LBA for indicating the specific logical address which needs conversion. Because the first physical address of the memory 140 is read frequently, the memory 140 may become damaged. Accordingly, the specific file of the first physical address may not be read accurately. By utilizing the data storage method of the present invention, the specific logical address could be converted from mapping to the first physical address to mapping to the second physical address. Reading errors of the data which is caused by over-reading the first physical address can be avoided.

Furthermore, after the specific logical address has been converted and mapped to the second physical address, the controller 120 transmits a conversion-finish instruction to the host 200 which is coupled to the controller 120. The conversion-finish instruction belongs to a read-type instruction. After the conversion-finish instruction has been read by the host 200, the host 200 will obtain information that the data storage device 100 has converted the physical address. In addition, the converted second physical address could be included by the conversion-finish instruction, so that the host 200 obtains the information that the data storage device 100 has mapped the specific logical address to the second physical address. Therefore, after the host 200 receives the conversion-finish instruction, it could continue to frequently read the specific file. Since the specific file has been stored on another second physical address which is different from the original first physical address, the specific file can be frequently read by the host 200 without causing damage to the memory 140.

In another embodiment, the host 200 records and analyzes the access number of a plurality of data stored in the data storage device 100 to determine the specific logical address which needs conversion. When the access number of at least one of the data is greater than a threshold value, the host 200 determines that the logical address corresponding to the data will be the specific logical address. Specifically, the storage module 240 of the host 200 could record the data accessed by the host 200. The processor 220 calculates the access number of the data of the storage module 240, and analyzes whether the access number of data is greater than the threshold value or not. For example, the processor 220 could include a digital signal processor (DSP), a microcontroller (MCU), a central-processing unit (CPU) or a plurality of parallel processors relating the parallel processing environment to implement the operating system (OS), firmware, driver and/or other applications of the electronic device. The storage module 240 includes a random access memory (RAM), a read-only memory (ROM), a flash memory, or a magnetic memory. If the access number is greater than the threshold value, it means that a specific data is frequently accessed by the host 200, which could result in damage to a block of certain physical addresses of the data storage device 100. By calculating and analyzing the access number for data by the host 200, damage caused by over-accessing the same data by the data storage device 100 could be further prevented to access data correctly.

It should be noted that the above threshold value is determined by the usage environment of the data storage device 100 and/or the type of memory 140. For example, the memory 140 is divided in two types including the single level cell (SLC) memory and the multiple level cell (MLC) memory. The voltage for driving the MLC memory is higher than the voltage for driving the SLC memory, and the storage density of the MLC memory is at least twice the storage density of the SLC memory. Therefore, the threshold value of the MLC memory will be larger than the threshold value of the SLC memory. For example, the threshold value of the MLC memory is about 1500~2000, and the threshold value of the SLC memory is about 500~1000. In addition, the usage environment of the data storage device 100 is also one of the factors for determining the threshold value. The usage environment could be the amplitude and variance of temperature, humidity and pressure of the position of the data storage device 100. For example, when the data storage device 100 is used in a tropical region or a frigid region with extreme temperature, or used in the environment of a huge temperature variance, it is easier for the data storage device 100 to become damaged due to frequent access. Therefore, when the data storage device 100 is used in an extreme environment or an environment of great variance, the threshold value will be lower. When the data storage device 100 is used in a gentle environment or a low-variance environment, the threshold value will be larger.

In addition, in another embodiment, the storage module 240 of the host 200 records the access number of the data of the data storage device 100 with the unit of file, data size and/or cluster. The processor 220 calculates the access number of file, data size and/or cluster for data of the storage module 240, and analyzes whether the access number is larger than the threshold value or not. When the access number of at least one data of the above data is greater than the threshold value, the conversion-requesting instruction will be generated by the host 200. Specifically, when the host 200 needs to access a specific file, it could assign the LBA for access and its data size corresponding to the specific file. By recording and analyzing the access number of the accessed LBA, the specific LBA which is accessed frequently can be found. Afterwards, the specific LBA can be refreshed by the method of conversion between logical addresses and physical addresses.

The host 200 can utilize the setting file or recording file of the OS to record and manage the access number of the data of the data storage device 100 in the form of a table. The processor 220 calculates the access number of each file with the unit of file. For example, the map file of city A is read 10 times, and the map file of city B is read 50 times. Furthermore, the host 200 could also record them with the unit of data size. For example, LBA0 is accessed 150 times, and LBA100 is accessed 1000 times. The host 200 could also record them with the unit of cluster. For example, the cluster 0 is accessed 49 times, and the cluster 10 is accessed 80 times. Because the file could have various sizes, the access number of each LBA may not be calculated correctly only with the unit of file. Therefore, by calculating with the unit of data size or cluster, the LBA which is frequently read could be found efficiently to prevent the data storage device 100 from becoming damaged.

Generally, the host 200 could not only calculate the access number of LBA, but also predict whether the specific LBA will be accessed frequently in the future. Therefore, in order to find the LBA which is frequently read effectively, the host 200 is utilized to calculate and analyze the access number of LBA. In addition, regarding the data storage device 100, the controller 120 manages and monitors the operation of the memory 140, such as the mapping relationship of logical address and physical address, average writing of data, and monitoring erase number. It is difficult for the controller 120 to calculate the access number of each LBA and discover the specific LBA which is read frequently. Furthermore, it is also difficult for the data storage device 100 to predict whether or not the host 200 will frequently read the specific LBA in the future. Therefore, calculating and analyzing the access number by the host to discover the frequent-read specific LBA can share the loading of the controller 120, prevent damage to the data storage device 100, and make the operation more smooth.

Figure 2:
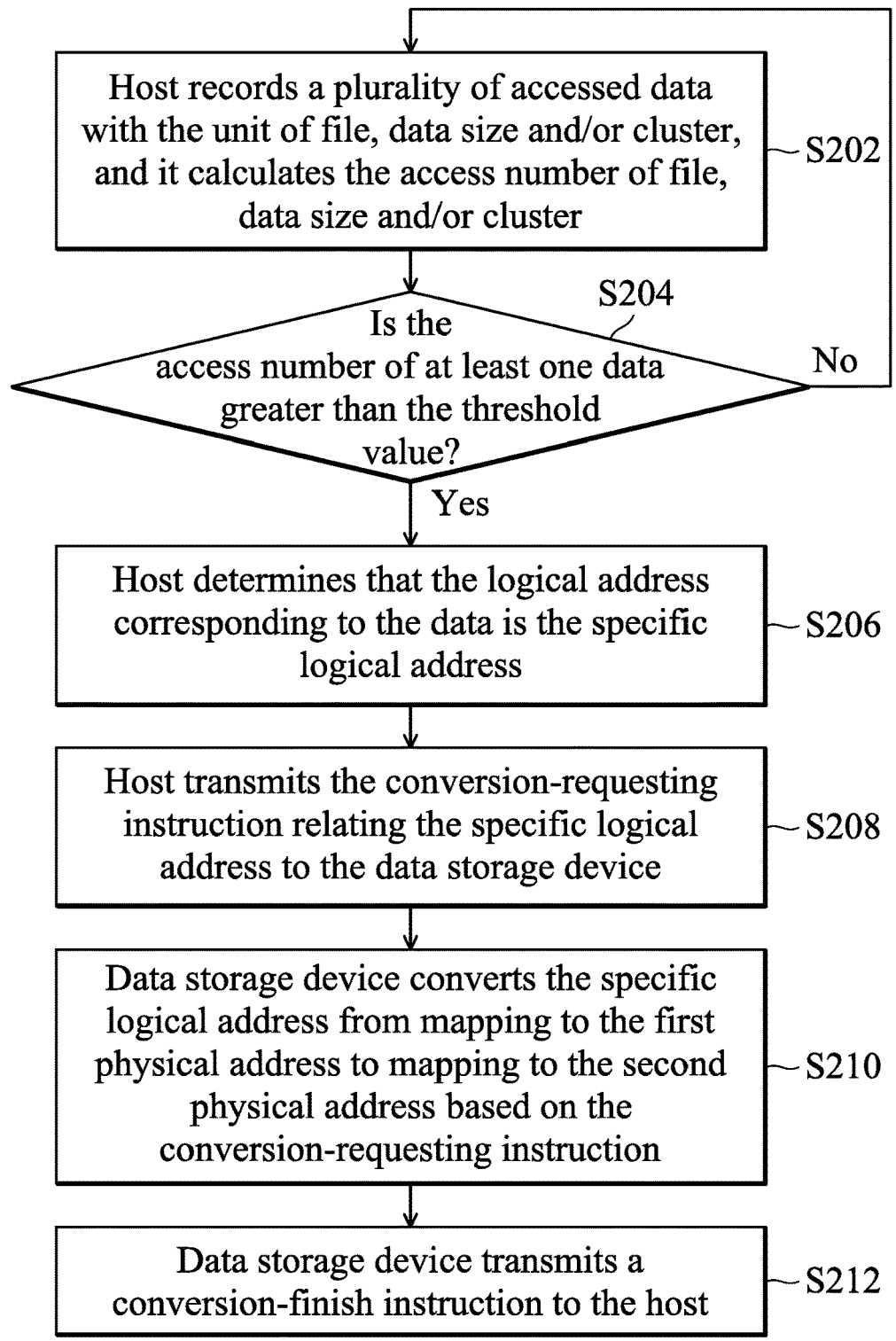
FIG. 2 is a flowchart of a data storage method according to an embodiment of the invention.

FIG. 2 is a flowchart of a data storage method according to an embodiment of the invention where the conversion-requesting instruction is transmitted by the host 200. In step S202, the host 200 records a plurality of data accessed by the data storage device 100 with the unit of file, data size and/or cluster, and it calculates the access number of file, data size and/or cluster. In step S204, the host 200 determines whether the access number of at least one data is greater than the threshold value or not. If there is no data whose access number is greater than the threshold value, step S202 is executed. If there is at least one data whose access number is greater than the threshold value, step S206 is executed so that the host 200 determines that the logical address corresponding to the data is the specific logical address. Afterwards, in step S208, the host 200 transmits the conversion-requesting instruction relating the specific logical address to the data storage device 100. In step S210, the data storage device 100 converts the specific logical address from mapping to the first physical address to mapping to the second physical address based on the conversion-requesting instruction. In step S212, the data storage device 100 transmits a conversion-finish instruction to the host 200.

It should be noted that when the host 200 cannot calculate the access number to find the frequently-read specific LBA, the above operations can be executed by the data storage device 100. In one embodiment, the controller 120 of the data storage device 100 analyzes the access number of the physical address of the memory 140. When the access number of at least one physical address of the above physical addresses is greater than the threshold value, the controller 120 determines that the physical address is the first physical address which needs conversion. Afterwards, the data storage device 100 generates a conversion-requesting instruction. The specific logical address whose access number is greater than the threshold value is converted from mapping to the first physical address to mapping to the second physical address. In other words, when the access number of at least one physical address of the above physical addresses is greater than the threshold value, the data storage device 100 generates a conversion-requesting instruction. After mapping the second physical address, the data storage device 100 transmits a conversion-finish instruction to the host 200 for indicating that the specific logical address has been refreshed. Therefore, when the host 200 detects that the above specific logical address needs refreshing due to frequent reading, the data storage device 100 does not need to receive the conversion-requesting instruction to refresh again since the host 200 has received the conversion-finish instruction.

Figure 3:
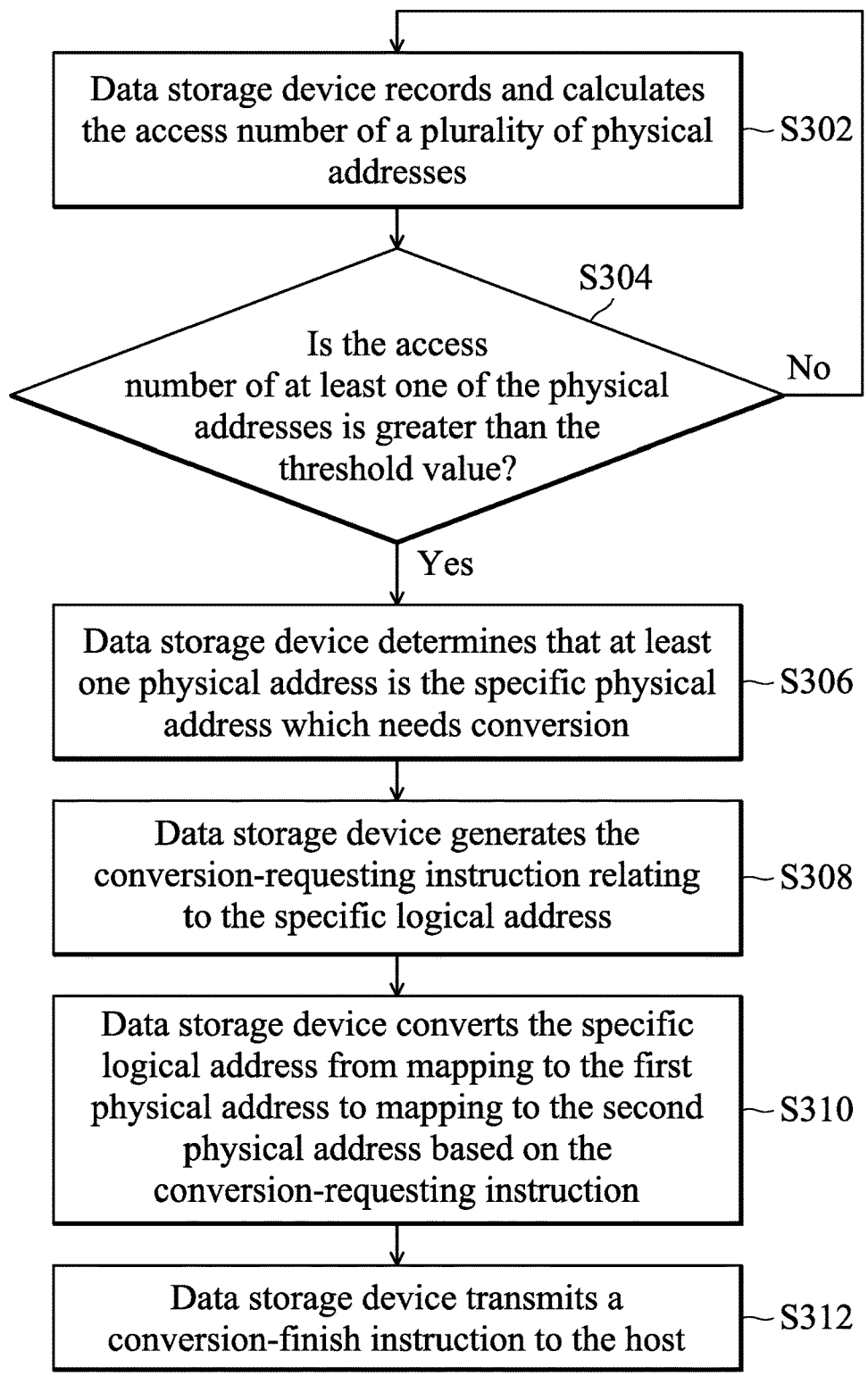
FIG. 3 is a flowchart of a data storage method according to an embodiment of the invention.

FIG. 3 is a flowchart of a data storage method according to an embodiment of the invention where the conversion-requesting instruction is transmitted by the data storage device 100. In step S302, the data storage device 100 records and calculates the access number of a plurality of physical addresses. In step S304, the data storage device 100 determines whether the access number of at least one physical address of the above physical addresses is greater than the threshold value or not. If there is no data whose access number is greater than the threshold value, step S302 is executed. If there is at least one data whose access number is greater than the threshold value, step S306 is executed so that the data storage device 100 determines that at least one physical address is the specific physical address which needs conversion. Afterwards, in step S308, the data storage device 100 generates the conversion-requesting instruction relating to the specific logical address. In step S310, the data storage device 100 converts the specific logical address from mapping to the first physical address to mapping to the second physical address based on the conversion-requesting instruction. In step S312, the data storage device 100 transmits a conversion-finish instruction to the host 200.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, utilized for storing a plurality of data, comprising:
    a memory, comprising a plurality of blocks, wherein each of the blocks has different respective physical addresses; and
    a controller, coupled to the memory, configured to map the physical addresses to a plurality of logical addresses, wherein the controller is configured to receive a conversion-requesting instruction indicating a specific logical address which needs conversion and converts the specific logical address from mapping to a first physical address to mapping to a second physical address based on the conversion-requesting instruction to avoid over-reading of the first physical address by storing at least one data corresponding to the specific logical address on the second physical address in response to the conversion-requesting instruction,
    wherein when an access number of the at least one data corresponding to the specific logical address is greater than a threshold value, the specific logical address is determined as needing conversion, and
    wherein the at least one data is recorded with a unit of file, data size and/or cluster, and the access number of the at least one data is calculated based on the access number of the file, the data size and/or the cluster.

2. The data storage device as claimed in claim 1, wherein after the specific logical address is converted for mapping to the second physical address, the controller is configured to transmit a conversion-finish instruction to a host which couples to the controller.

3. The data storage device as claimed in claim 2, wherein the host is configured to generate the conversion-requesting instruction when the access number of the at least one data corresponding to the specific logical address is greater than the threshold value.

4. The data storage device as claimed in claim 3, wherein the host is configured to analyze the access number of the at least one data corresponding to the specific logical address to determine the specific logical address which needs conversion.

5. The data storage device as claimed in claim 4, wherein the host is configured to record the at least one data with the unit of file, data size and/or cluster, and calculate the access number of the file, the data size and/or the cluster.

6. The data storage device as claimed in claim 1, wherein the threshold value is determined by type of memory and/or usage environment of the data storage device.

7. The data storage device as claimed in claim 2, wherein the data storage device is configured to generate the conversion-requesting instruction when the access number of the at least one data corresponding to the specific logical address is greater than the threshold value.

8. The data storage device as claimed in claim 7, wherein the controller is further configured to analyze an access number of the physical addresses, and when the access number of at least one physical address of the physical addresses is greater than the threshold value, the controller determines that the at least one physical address is the first physical address which needs conversion.

9. The data storage device as claimed in claim 8, wherein the threshold value is determined by the type of memory and/or usage environment of the data storage device.

10. A data storage method, utilized for a host and a data storage device for storing at least one data, comprising:
    mapping a plurality of physical addresses to a plurality of respective logical addresses; and
    after receiving a conversion-requesting instruction indicating a specific logical address which needs conversion, converting the specific logical address from mapping to a first physical address to mapping to a second physical address based on the conversion-requesting instruction to avoid over-reading of the first physical address by storing at least one data corresponding to the specific logical address on the second physical address in response to the conversion-requesting instruction,
    wherein when an access number of the at least one data corresponding to the specific logical address is greater than a threshold value, the specific logical address is determined as needing conversion, and
    wherein the at least one data is recorded with a unit of file, data size and/or cluster, and the access number of the at least one data is calculated based on the access number of the file, the data size and/or the cluster.

11. The data storage method as claimed in claim 10, further comprising, after converting the specific logical address for mapping to the second physical address, transmitting a conversion-finish instruction to the host.

12. The data storage method as claimed in claim 11, wherein the conversion-requesting instruction is generated by the host when the access number of the at least one data corresponding to the specific logical address is greater than the threshold value.

13. The data storage method as claimed in claim 12, further comprising analyzing the access number of the at least one data by the host to determine the specific logical address which needs conversion.

14. The data storage method as claimed in claim 13, further comprising recording the at least one data with the unit of file, data size and/or cluster, and calculating the access number of the file, the data size and/or the cluster by the host.

15. The data storage method as claimed in claim 10, wherein the threshold value is determined by the type of memory and/or usage environment of the data storage device.

* * * * *